Patented May 10, 1949

2,469,683

UNITED STATES PATENT OFFICE 2,469,683

ANION ACTIVE RESINS AND PROCESSES OF PRODUCING SAME

James R. Dudley, Cos Cob, and Lennart A. Lundberg, Stamford, Conn., assignors to American Cyanamid Company, New York, N. Y., a corporation of Maine No Drawing. Application September 15, 1945, Serial No. 616,644

13 Claims. (Cl. 260—2)

This invention relates to resins suitable for the removal of anions from fluid media and to processes of purifying fluid media by means of such resins.

Epichlorohydrin has previously been condensed with amines to form water soluble products useful in the dyeing and printing arts. In the production of such substances 1 mol of epichlorohydrin is reacted with 1 mol of a primary amine.

An object of the present invention is to provide a resinous material which is insoluble in water and which is suitable for removing anions from water and other fluid media.

Another object of the present invention is to provide an improved process for removing anions from water and other fluid media.

Still another object of the present invention is to prepare an anion active resin from epichlorohydrin and a polyamine.

A further object of the present invention is to provide a process of producing resinous materials suitable for the removal of anions from fluid media.

The first, third, fourth and other objects are attained by condensing an alpha-chloro-beta, gamma-epoxy organic compound, e. g., epichlorohydrin with an alkylene polyamine in the form of the free base, by bringing them together in a molar ratio of at least 2:1, respectively.

The second object is attained by contacting a fluid containing anions with an insoluble resin prepared in the manner described above.

The following examples in which the proportions are in parts by weight are given by way of illustration and not in limitation.

EXAMPLE 1

| | Parts |
|---|---|
| Epichlorohydrin (30 mols) | 2,776 |
| Tetraethylene pentamine (10 mols) | 1,890 |
| Water | 5,500 |
| Sodium hydroxide (5 mols) | 200 |

The tetraethylene pentamine is charged into a suitable reaction vessel provided with an agitator and a means for cooling the vessel. 4,500 parts of the water are added to the tetraethylene pentamine and the resulting solution is cooled to about 3° C. The epichlorohydrin is added slowly over a period of 30 to 70 minutes or more while the reacting mixture is being continuously agitated. After all the epichlorohydrin has been added the resulting syrup is maintained at a temperature below about 10° C. for 1½ hours or more. The syrup is then permitted to warm up to about room temperature over a period of 45 minutes or more, and the sodium hydroxide dissolved in 1,000 parts of the water is added. The resulting solution is heated for example by passing steam into a jacket surrounding the reaction vessel for about 5 minutes, thereby causing the syrup to gel. The gel is broken up in small pieces and cured in trays placed in an oven at a temperature of about 95–105° C. for 17–18 hours. The cured resin is ground and screened and the 20–40 mesh material is placed in a suitable bed through which water containing 0.004 N sulfuric acid and 0.002 N HCl is passed. The resin removes the acid from the water and its capacity is found to be equivalent to 24–27 kilograms (hereinafter abbreviated "kgrs.") of calcium carbonate per cubic foot of resin. The resin has a density of about 14 lbs. cu. ft.

After regeneration the exhausted resin is used to remove acid from water again and this cycle may be repeated 100 or more times without loss of capacity. No decrease in capacity is found with repeated cycles where the water-containing acid is at a temperature of about 70° C.

EXAMPLE 2

| | Parts |
|---|---|
| Epichlorohydrin (25 mols) | 2,313 |
| Tetraethylene pentamine (10 mols) | 1,890 |
| Water | 4,300 |

These substances are reacted in the same general manner as described in Example 1 except that no sodium hydroxide is added. A resin having a capacity equivalent to about 21.4 kgrs. of calcium carbonate per cubic foot of resin is obtained and it has a density of about 18.7 pounds/cu. ft.

EXAMPLE 3

| | Parts |
|---|---|
| Epichlorohydrin (35 mols) | 3,238 |
| Tetraethylene pentamine (10 mols) | 1,890 |
| Water | 6,000 |
| Sodium hydroxide (10 mols) | 400 |

The sodium hydroxide is dissolved in 1,000 parts of the water and the substances reacted in the manner described in Example 1 to produce a resin having a capacity equivalent to about 16.7 kgrs. of calcium carbonate per cubic foot of resin and it has a density of about 10.4 pounds/cu. ft.

EXAMPLE 4

| | Parts |
|---|---|
| Epichlorohydrin (40 mols) | 3,700 |
| Tetraethylene pentamine (10 mols) | 1,890 |
| Water | 6,000 |
| Sodium hydroxide (15 mols) | 600 |

The sodium hydroxide is dissolved in 1,500 parts of the water and the reaction is carried out as in Example 1 except that the reaction mixture is not heated after the addition of the sodium hydroxide. A product having a capacity equivalent to 15 kgrs. of calcium carbonate per cubic foot of resin is obtained, and the product has a density of about 10.4 pounds/cu. ft.

EXAMPLE 5

| | Parts |
|---|---|
| Epichlorohydrin (45 mols) | 4,163 |
| Tetraethylene pentamine (10 mols) | 1,890 |
| Water | 6,500 |
| Sodium hydroxide (20 mols) | 800 |

The sodium hydroxide is dissolved in the water and the reactions carried out as described in Example 1. The product has a capacity equivalent to 19.2 kgrs. of calcium carbonate per cubic foot of resin and it has a density of 11.1 pounds/cu. ft.

EXAMPLE 6

| | Parts |
|---|---|
| Epichlorohydrin (30 mols) | 2,776 |
| Tetraethylene pentamine (10 mols) | 1,890 |
| Water | 4,520 |
| Sodium hydroxide (10 mols) | 400 |

The sodium hydroxide is dissolved in 870 parts of the water and the reactions carried out as described in Example 1. The product has a capacity equivalent to about 22.3 kgrs. of calcium carbonate per cubic foot of resin and it has a density of about 10.5 pounds/cu. ft.

EXAMPLE 7

| | Parts |
|---|---|
| Epichlorohydrin (30 mols) | 2,776 |
| Tetraethylene pentamine (10 mols) | 1,890 |
| Water | 5,360 |
| Sodium Hydroxide (20 mols) | 800 |

The sodium hydroxide is dissolved in 1710 parts of the water and the reaction is carried out as described in Example 1. A product having a capacity equivalent to 14 kgrs. of calcium carbonate per cubic foot of resin and having a density of 9.7 pounds/cu. ft. is obtained.

EXAMPLE 8

A resin is prepared in accordance with Example 2 except that it is cured under different conditions. In this example the moist gel after being broken up is placed in a vessel provided with a reflux condenser and a jacket through which hot oil is circulated. The resin is heated in this vessel under reflux for about 17½ hours at 95–105° C. and thereafter the resin is air-dried. It is ground, immersed in water and screened wet to 20–40 mesh size. This product has a capacity equivalent to 15.3 kgrs. per cubic foot of resin and a density of 12.1 pounds/cu. ft.

EXAMPLE 9

Example 8 is repeated except that twice the weight of water as compared to the weight of resin is added before heating. The capacity of the product obtained in this example is equivalent to 10.3 kgrs. of calcium carbonate per cubic foot of resin and the product has a density of 6.8 pounds/cu. ft.

EXAMPLE 10

| | Parts |
|---|---|
| Epichlorohydrin (30 mols) | 2,776 |
| Ethylene diamine (10 mols) | 600 |
| Water | 2,250 |
| Sodium hydroxide (20 mols) | 800 |

The sodium hydroxide is dissolved in 1000 parts of the water, and these substances reacted in accordance with the procedure of Example 1. The product has a capacity equivalent to 13.9 kgrs. of calcium carbonate per cubic foot of resin and it has a density of 11.9 pounds/cu. ft.

EXAMPLE 11

| | Parts |
|---|---|
| Epichlorohydrin (25 mols) | 2,313 |
| Diethylene triamine (10 mols) | 1,030 |
| Water | 3,750 |
| Sodium hydroxide (7.5 mols) | 300 |

The sodium hydroxide is dissolved in 750 parts of the water and the reaction carried out as described in Example 1. The product has a capacity equivalent to 20.7 kgrs. of calcium carbonate per cubic foot of resin, and it has a density of 18.1 pounds/cu. ft. of resin.

EXAMPLE 12

| | Parts |
|---|---|
| Epichlorohydrin (25 mols) | 2,313 |
| Di(3-aminopropyl)-amine (10 mols) | 1,310 |
| Water | 3,000 |

These substances are reacted in accordance with Example 1 except that no sodium hydroxide is added. The capacity of the product is equivalent to 13.6 kgrs. of calcium carbonate per cubic foot or resin and the density is 21.9 pounds/cu. ft.

EXAMPLE 13

| | Parts |
|---|---|
| Epichlorohydrin (25 mols) | 2,313 |
| Polyethylene polyamine mixture (10 mols) | 1,181 |
| Water | 4,250 |
| Sodium Hydroxide (7.5 mols) | 300 |

The polyamine mixture contains about 75% diethylene triamine, 15% triethylene tetramine and 10% tetraethylene pentamine. The sodium hydroxide is dissolved in about 750 parts of the water, and the reaction carried out in accordance with Example 1. An anion active resin having a capacity equivalent to 18.3 kgrs. of calcium carbonate per cubic foot of resin is obtained, and the product has a density of 14.3 pounds/cu. ft.

EXAMPLE 14

| | Parts |
|---|---|
| Epichlorohydrin (30 mols) | 2,776 |
| A polyethylene polyamine mixture (10 mols) | 1,181 |
| Water | 4,250 |
| Sodium hydroxide | 240 |

The polyethylene polyamine mixture contains about 75% of diethylene triamine, 15% of triethylene tetramine and 10% of tetraethylene pentamine. The sodium hydroxide is dissolved in about 750 parts of the water and the reaction is carried out as described in Example 1. The capacity of the final product is equivalent to about 20.3 kgrs. of calcium carbonate per cubic foot of resin and the density is about 16.4 pounds/cu. ft.

EXAMPLE 15

*Preparation of a polyamine*

| | Parts |
|---|---|
| Tetraethylene pentamine | 284 |
| Trimethylene dibromide | 202 |
| Water | 1,100 |
| Sodium hydroxide | 40 |

The tetraethylene pentamine was placed in a suitable reaction vessel provided with a means of heating the vessel, such as a steam jacket. The reaction vessel is also provided with an agitator. The tetraethylene-pentamine is heated to about 85° C. while the trimethylene dibromide is added slowly while maintaining the temperature at about 85-90° C. After all the trimethylene dibromide is added the resulting viscous syrup is heated for about one-half hour or more. The syrup is dissolved in one thousand parts of the water and then cooled to about 5° C. The sodium hydroxide is dissolved in 100 parts of the water and is added in order to form the free base of polyamine. Theoretically, a linear polyamine containing 15 nitrogen atoms per mole molecule should be formed, but it is believed that the composition is a mixture containing some polyamines having fewer than 15 nitrogen atoms as well as some polyamines having more than 15 nitrogen atoms per molecule.

*Preparation of resin*

The polyamine solution prepared in accordance with the foregoing is maintained at about 5° and agitated, while 254 parts of epichlorohydrin is added slowly. The resulting reacting mixture is kept at about 5° C. for about 1 hour, and then the mixture is gradually heated by means of steam until it gels to form a firm opaque orange product. The resulting gel is broken up and cured, ground and screened in accordance with Example 1. The product has a capacity equivalent to 26.5 kgrs. of calcium carbonate per cubic foot of resin and a density of about 12.4 pounds/cu. ft.

EXAMPLE 16

*Preparation of polyamine*

|  | Parts |
|---|---|
| Tetraethylene pentamine | 284 |
| Trimethylene dibromide | 151 |
| Water | 1,100 |
| Sodium hydroxide | 30 |

These substances are reacted in the manner described in Example 15, the sodium hydroxide being dissolved in 100 parts of the water to prepare a polyamine solution, the polyamine of which should theoretically contain 10 nitrogen atoms per molecule.

*Preparation of resin*

The polyamine solution prepared in accordance with this example is condensed with 277 parts of epichlorohydrin in accordance with Example 1 to form an anion active material having a capacity equivalent to 23.1 kgrs. of calcium carbonate per cubic foot of resin and having a density of 11.8 pounds/cu. ft.

EXAMPLE 17

*Preparation of polyamine*

|  | Parts |
|---|---|
| Tetraethylene pentamine | 284 |
| Trimethylene dibromide | 121 |
| Water | 850 |
| Sodium hydroxide | 24 |

The polyamine solution is prepared by reacting these substances in the manner described in Example 15, the sodium hydroxide being dissolved in 100 parts of the water and the 750 parts of water being used in place of the 1000 parts of water used in Example 15.

*Preparation of resin*

The polyamine solution prepared in accordance with the above procedure is placed in a suitable reaction vessel and 291 parts of epichlorohydrin added thereto, and the reaction and further processing is carried out in accordance with Example 1. An anion active resin having a capacity equivalent to 23.8 kgrs. of calcium carbonate per cubic foot of resin and having a density of 12.4 pounds/cu. ft. is obtained.

EXAMPLE 18

|  | Parts |
|---|---|
| Tetraethylene pentamine | 473 |
| Water | 1,700 |
| Sodium hydroxide | 200 |
| Ethylene dichloride | 247 |

A solution containing the tetraethylene pentamine, 200 parts of the water and the sodium hydroxide is heated in a suitable reaction vessel provided with a means for heating and cooling, and provided with an agitator. The solution is heated to about 85° C. and the ethylene dichloride is then added slowly at such a rate that the temperature does not rise above 95° C. During the addition of the ethylene dichloride an exothermic reaction occurs which continues for a short time after all of the ethylene dichloride is added. After the exothermic reaction subsides the resulting syrup is heated for about ½–1 hour to complete the reaction. During the reaction a considerable amount of sodium chloride separates and this may be dissolved by adding 1500 parts of the water.

*Preparation of resin*

The polyamine solution prepared in accordance with the foregoing procedure is cooled to a temperature below about 5° C. and 347 parts of epichlorohydrin are added slowly with agitation. After about ¾ of an hour the temperature of the reacting mixture is permitted to rise gradually, and then the syrup is heated by means of steam which causes the syrup to gel immediately to form a transparent rigid material. The resulting gel is broken up and further processed in the manner described in Example 1 to produce an anion active material having a capacity of 9.3 kgrs. of calcium carbonate per cubic foot of resin and a density of about 3.5 pounds/cu. ft.

EXAMPLE 19

|  | Parts |
|---|---|
| Epichlorohydrin (10 mols) | 920 |
| Ethylene diamine (68.8%) (5 mols) | 436 |
| Water | 1,650 |
| Sodium hydroxide | 206 |

To a solution of the ethylene diamine in about 1250 parts of the water, the epichlorohydrin is added slowly while maintaining the temperature below 10° C. An opaque oil separates and then a crystalline solid forms. After about 1½ hours, the reaction mixture is heated by means of steam in a jacket surrounding the reaction vessel. An exothermic reaction follows and the solid which was suspended in liquid dissolves to yield a clear yellow syrup which is about neutral. The syrup is chilled and a solution containing the sodium hydroxide in 400 parts of the water is added slowly. After about 30 minutes, the syrup is heated by means of steam and a gel forms in about 20 minutes. The resulting soft, orange, rubbery gel is cured in accordance with the procedure described in Example 1. The product has a capacity equivalent to 18.5 kgrs. of calcium carbonate per cubic foot of resin, and it has a density of about 14 pounds/cu. ft.

EXAMPLE 20

Example 19 is repeated except that the epichlorohydrin is added to the ethylene diamine solution at 65–70° C. No heat is applied as the reaction is exothermic and the temperature is regulated by the rate of addition of the epichlorohydrin to the ethylene diamine solution. After the addition of the epichlorohydrin to the ethylene diamine is complete, the exothermic reaction subsides and the reaction mixture is then heated by means of steam to produce a clear syrup which is neutral after about 10 minutes. After the addition of the sodium hydroxide solution, the reaction mixture is again heated by means of steam to produce a clear, orange, glossy gel. After this gel is cured and granulated in the manner described in Example 1, it is found to have a capacity equivalent to about 22.2 kgrs. of calcium carbonate per cubic foot of resin and to have a density of about 17 pounds/cu. ft.

Other polyalkylene polyamines may be substituted for part or all of those used in the preceding examples. Furthermore, mixtures of two, three, four, five, seven or any other number of polyamines may be employed.

Examples of suitable polyamines include 1,3-diaminopropane, 1,4-diamino-n-butane, 1,3-diamino-n-butane, 1,5-diamino-n-pentane, 1,6-diamino-n-hexane, 1,10-diamino-n-decane, 1,6-diamino-3 methyl-n-hexane, 3,3'-diamino dipropyl ether, and other similar diamines containing hetero atoms in the chains separating the amino groups, triethylene tetramine, pentaethylene hexamine and all of the higher homologs thereof containing additional

—CH₂CH₂NH— groups in the chain between the primary amino groups etc. Complex mixtures of polyethylene polyamines of high molecular weight obtained by the addition of large numbers of molecules of ammonia to ethylene dibromide or ethylene dichloride and the like may be used.

It is essential that the molar ratio of epichlorohydrin to the polyamine be at least about 2:1 when the two substances are brought together in order to obtain insoluble resins. There is no maximum amount of epichlorohydrin which may be used but generally it should not exceed a molar ratio of 5:1 or with polyamines having more than five amino groups the ratio should not be greater than 1 mol of epichlorohydrin for each amino group in the polyamine. While proportions of epichlorohydrin larger than those mentioned may be used if desired, it will generally be undesirable since this will ordinarily reduce the capacity of the resulting resins. On the other hand the use of higher ratios of epichlorohydrin to polyamine may be advantageous for economic reasons.

While the addition of a strong alkali, such as sodium hydroxide, is not essential, it is often desirable when the molal ratio of epichlorohydrin to polyamine is 3:1 or greater. The higher the ratio of epichlorohydrin to polyamine, the slower the reaction and, therefore, in order to speed up the reaction, the use of some strong alkali to react with the hydrochloric acid, which is set free in the reaction, is helpful. On the other hand the use of alkali, particularly in large quantities is undesirable, since it reduces the structural rigidity or resistance of the attrition of the product. The molar ratio of alkali to the epichlorohydrin is desirably between about 1:10 and 1:1. Any strong alkali may be used which will not condense with the epichlorohydrin. Examples of suitable substances are sodium hydroxide, sodium carbonate, potassium hydroxide, potassium carbonate, lithium hydroxide, calcium hydroxide, etc.

Instead of epichlorohydrin other substances having an alpha-chloro-beta, gamma-epoxy arrangement are suitable for reaction with polyamines in accordance with this invention to produce anion active resins. Among these some examples are compounds of the following general formula:

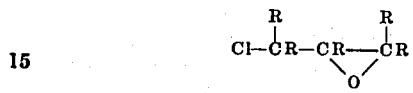

where R is the same or different organic radicals or hydrogen. Preferably, the R groups contain no strong acidic groups such as sulphonic acid groups but any organic radicals may be used since the R groups are not important. It is important that the chloro and epoxy groups be in the positions indicated. The R groups may, for example, be CH₃—, C₂H₅—, C₃H₇—, C₅H₁₁—, C₈H₁₇—, C₁₀H₂₁—, phenyl, benzyl, tolyl, xylyl, pyridyl, furyl, etc.

Among these some examples are:

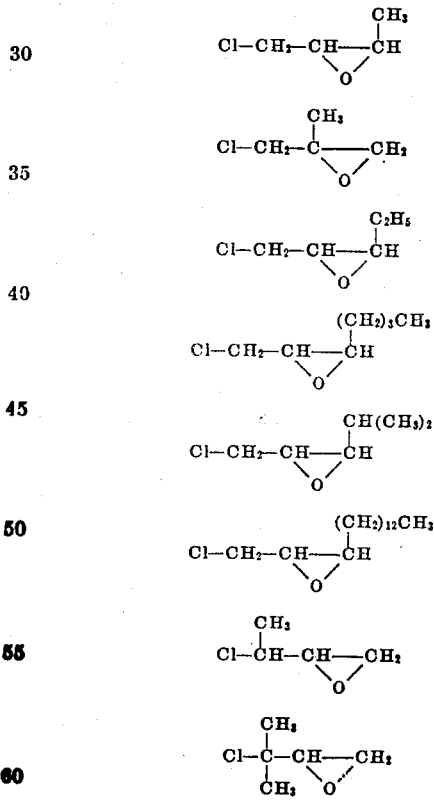

The use of a major proportion of substances such as 1,3-dichloro propanol-2 for reaction with alkylene polyamines alone or along with the alpha-chloro-beta,gamma-epoxy compounds is disclosed and claimed in a copending application of one of the present inventors namely, Lennart A. Lundberg, Serial No. 624,606, filed October 25, 1945. The reaction of compounds having a plurality of epoxy groups with alkylene polyamines is disclosed and claimed in a copending application of the other of the present inventors Serial No. 655,005, filed March 16, 1946. Among the substances which may be reacted with alkylene polyamines to produce anion active resins in accordance with the procedures set forth herein and which are covered in separate applications the following are a few examples:

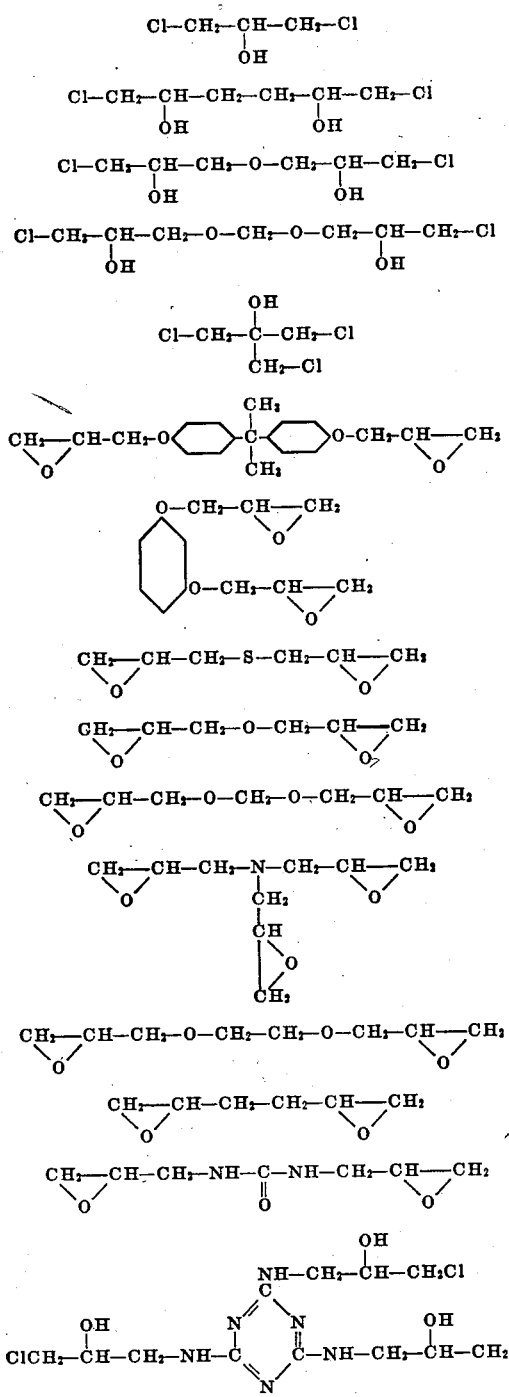

While the present invention does not cover the use of a major proportion or all of one of the compounds in the foregoing list of substances for reaction with an alkylene polyamine nevertheless, minor molal proportions with respect to the total substances reacted with the polyamine may be employed in accordance with this invention and minor molar proportions of the polyalkylene polyamine may be replaced with ammonia or mono- or polyamines other than the alkylene polyamines. Preferably however, polyalkylene polyamines are employed exclusively.

The condensation of the epichlorohydrin and polyamine may be carried out in the presence of any desired solvent which does not react with the reactants or the reaction products such as water, methanol, ethanol, the mono methyl- or mono-ethyl ethers of ethylene glycol, etc. While it is convenient to add the epichlorohydrin to the polyamine the order of addition may be reversed. The initial reaction of epichlorohydrin with a polyamine results mainly in the rupture of the epoxy ring and the formation of a 2-hydroxy-3-chloropropyl amine. This reaction is quite exothermic and for this reason the epichlorohydrin is mixed with the polyamine by adding one to the other slowly, in order to avoid overheating. Furthermore, the polyamine and the reaction mixture is preferably cooled for the same reason. However, the reaction may be carried out at ordinary room temperatures and/or even at elevated temperatures if the epichlorohydrin is added to the polyamine slowly in order to avoid any of the difficulties which may arise from overheating. The difficulties which may arise are practical difficulties such as rapid boiling of the reaction mixture, loss of the reactive materials by vaporization etc. In other words, the reaction temperature is not critical and, therefore, the temperature may be varied from about 0° C. up to 70° C. or even higher. However, in the condensation of the epichlorohydrin with a polyamine the reaction mixture is preferably cooled to permit the rupture of the epoxy ring and to prevent alkylation through the chloro groups. The products formed in the initial reaction are water-soluble. Apparently the condensation of 3 mols of epichlorohydrin with 1 mol of tetraethylene pentamine under the conditions used herein may be represented as follows:

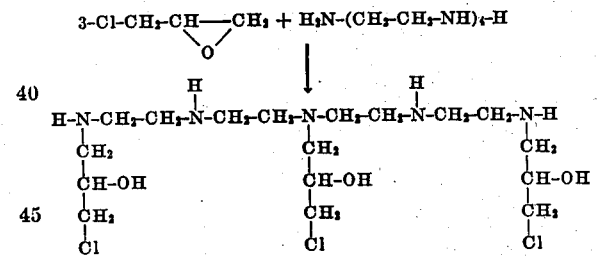

In the second stage usually when the reaction mixture is heated, (or more slowly if not heated) self-alkylation occurs between the chloro groups and the amine groups bearing hydrogen to form a three-dimensional, insoluble resin. This reaction may occur directly in accordance with the following scheme:

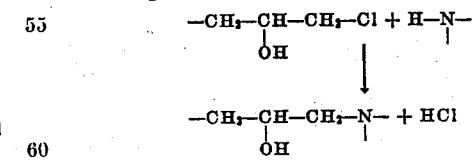

or it may occur indirectly where the first step is the formation of an epoxy ring followed by condensation with the amine in accordance with the following illustration:

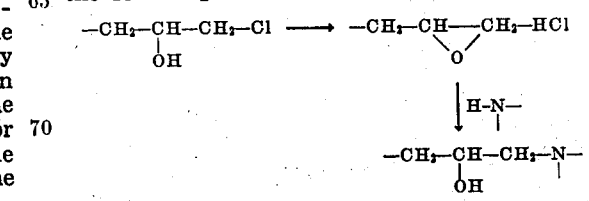

In any event the structure will probably be the same and this structure may be repeated as follows on the basis of the reaction of three of the units formed in the initial condensation shown above. The structure would then be:

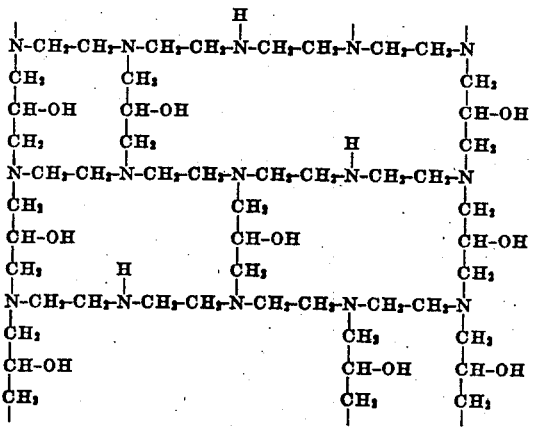

In view of the foregoing it is apparent that the resinous materials formed in accordance with this invention are condensation products and, accordingly, the curing of these resins is by condensation, and this occurs without the use of catalysts. Inasmuch as hydrochloric acid is set free alkali may be added as pointed out heretofore to absorb excess acid. The heat treatment which is given to the resin is a final step of the process and, although it has sometimes been called curing in the discussion, it is primarily a drying operation. During this heat-treatment the gel structure of the resin appears to be altered somewhat inasmuch as considerable shrinkage occurs. When the resin is rewet it does not swell to the same volume as it did before the heat-treatment, although the resin still swells to some extent.

The final heat-treatment or curing of the resin in accordance with our invention is preferably carried out at a temperature of 95–105° C. in dry heat, although other conditions may be used including temperatures from 50° up to about 125° C. or higher.

The anion active resins may be activated or regenerated by means of dilute alkaline solutions, such as for example, 0.1–10% aqueous solutions of sodium hydroxide, sodium carbonate, etc.

The resinous materials produced in accordance with this invention are suitable for the removal of all kinds of acids and anions in general from fluid media. They may be used to extract the strong mineral acids (preferably in relatively low concentrations), organic acids such as acetic acid, oxalic acid etc., from water and organic liquids. The anions of salts such as chloride ion, from ammonium chloride, or a sulfate ion from ammonium sulfate may be removed by means of the resinous products described herein.

The anion active resins are useful for many purposes, examples of which are the removal of acid from water, the removal of acid from alcoholic solutions, the purification of sugar juices, the purification of pectin, the removal of acid from aqueous formaldehyde solutions, etc. While the resins are especially suitable for the removal of anions from aqueous media they may be used to extract acid or anions from fluid media other than water, and they may even be used for the extraction of acids from gases. The resins may be used as absorbents for plant nutrients and as such may be used as a media for growing plants or as a means for applying nutrients to the soil.

To be sufficiently insoluble for practical use in the water purification art resins should have a sufficiently low solubility that it will not dissolve very rapidly by the solution to be treated. Thus, water should not dissolve more than 1 part of resin in 1000 parts of water when passed through a bed of resin (after the first cycle comprising an activation, exhaustion and reactivation of the resin).

While the mechanism of the reactions involved in the production of the resins described herein is believed to take place in accordance with the discussion set forth above, it is to be understood that we are not to be bound thereby. Furthermore, obviously many modifications and variations in the processes and compositions described herein may be made without departing from the spirit and scope of the invention as defined in the appended claims.

We claim:
1. A resinous material as in claim 8 wherein the polyamine is a polyethylene polyamine.
2. A resinous material as in claim 8 wherein the polyamine is tetraethylene pentamine.
3. A water insoluble, granular, resinous material obtained by a process comprising the steps of bringing together epichlorohydrin and at least one alkylene polyamine in the ratio of at least 2 mols, but not more than 1 mol for each amino group of said polyamine, of epichlorohydrin per mol of polyamine, heating the resulting condensation product to cause it to gel rapidly, curing the resulting gel by heating at 50° to about 125° C., and granulating the gel, said granular resinous material being of such low water solubility that water will not dissolve more than 1 part of resin in 1,000 parts of water when it is passed through a bed of resin after a first cycle comprising an activation, an exhaustion and a reactivation of the resin.
4. A water insoluble, granular, resinous material which is a condensation product prepared by a process comprising the step of bringing together a mixture of polyamines including diethylene triamine, triethylene tetramine and tetraethylene pentamine with epichlorohydrin in the ratio of at least 2 mols, but not more than 5 mols, of epichlorohydrin to 1 mol of said mixture of polyamines, permitting the resulting condensation product to gel, curing the resulting gel by heating at 50° to about 125° C., and granulating the gel, said granular resinous material being of such low water solubility that water will not dissolve more than 1 part of resin in 1,000 parts of water when it is passed through a bed of resin after the first cycle comprising an activation, exhaustion and reactivation of the resin.
5. A water insoluble, granular, resinous material which is a condensation product prepared by a process comprising the step of bringing together a mixture of polyethylene polyamines containing a major proportion of tetraethylene pentamine and the higher homologs thereof with epichlorohydrin in the ratio of at least 2 mols, but not more than 5 mols, of epichlorohydrin to 1 mol of said mixture of polyamines, permitting the resulting condensation product to gel, curing the resulting gel by heating at 50° to about 125° C., and granulating the gel, said granular resinous material being of such low water solubility that water will not dissolve more than 1 part of resin in 1,000 parts of water when it is passed through a bed of resin after the first cycle comprising an activation, exhaustion and reactivation of the resin.

6. A process as in claim 10 wherein said polyamine is tetraethylene pentamine.

7. A resinous material as in claim 8 wherein the alpha-chloro-beta, gamma-epoxy hydrocarbon is epichlorohydrin.

8. A water insoluble granular resinous material obtained by a process comprising a step of bringing together an alpha-chloro-beta, gamma-epoxy hydrocarbon and at least one alkylene polyamine in the ratio of at least 2 mols of said hydrocarbon per mol of polyamine, the number of mols of said hydrocarbon being not greater than 1 mol for each amino group of said polyamine, permitting the resulting condensation product to gel, curing the resulting gel by heating at 50° C. to about 125° C., and granulating the gel, said granular resinous material being of such low water solubility that water will not dissolve more than 1 part of resin in 1,000 parts of water when it is passed through a bed of resin after the first cycle comprising an activation, exhaustion and reactivation of the resin.

9. A process of preparing a water insoluble, granular, resinous material which comprises bringing together at least 2 mols of an alpha-chloro-beta,gamma-epoxy hydrocarbon with 1 mol of at least one alkylene polyamine to form a gel, heating the gel thus obtained at 50° to about 125° C., and granulating the gel, the number of mols of said hydrocarbon being not greater than 1 mol for each amino group of said polyamine, said granular resinous material being of such low water solubility that water will not dissolve more than 1 part of resin in 1,000 parts of water when it is passed through a bed of resin after a first cycle comprising an activation, an exhaustion and a reactivation of the resin.

10. A process of preparing a water-insoluble, granular, resinous material which comprises bringing together at least 2 mols of epichlorohydrin with 1 mol of at least one polyalkylene polyamine to form a gel, heating the gel thus obtained at 50° to about 125° C., and granulating the gel, the number of mols of said epichlorohydrin being not greater than 1 mol for each amino group of said polyamine, said granular resinous material being of such low water solubility that water will not dissolve more than 1 part of resin in 1,000 parts of water when it is passed through a bed of resin after a first cycle comprising an activation, an exhaustion and a reactivation of the resin.

11. A process of preparing a water-insoluble, granular, resinous material comprising bringing together at least 3 mols of epichlorohydrin with 1 mol of tetraethylene pentamine to form a gel, heating the gel thus obtained at 50° to about 125° C., and granulating the gel, the number of mols of said epichlorohydrin being not greater than 1 mol for each amino group of said polyamine, said granular resinous material being of such low water solubility that water will not dissolve more than 1 part of resin in 1,000 parts of water when it is passed through a bed of resin after a first cycle comprising an activation, an exhaustion and reactivation of the resin.

12. A process of preparing a water-insoluble, granular, resinous material comprising bringing together at least 2 mols of epichlorohydrin with 1 mol of at least one polyethylene polyamine, adding alkali equivalent to about 0.1–1 mol per mol of epichlorohydrin, thereafter permitting the resulting condensation product to gel and heating the gelled material at 50° to about 125° C., to form a dry product which is granulated, the number of mols of said epichlorohydrin being not greater than 1 mol for each amino group of said polyamine, said granular resinous material being of such low water solubility that water will not dissolve more than 1 part of resin in 1,000 parts of water when it is passed through a bed of resin after a first cycle comprising an activation, an exhaustion and a reactivation of the resin.

13. A resinous material as in claim 8 wherein the polyamine is di(3-aminopropyl)-amine.

JAMES R. DUDLEY.
LENNART A. LUNDBERG.

REFERENCES CITED

The following references are of record in the file of this patent:

UNITED STATES PATENTS

| Number | Name | Date |
| --- | --- | --- |
| 2,046,720 | Bottoms | July 7, 1936 |
| 2,228,514 | Griessbach | Jan. 14, 1941 |
| 2,354,172 | Myers | July 18, 1944 |

FOREIGN PATENTS

| Number | Country | Date |
| --- | --- | --- |
| 443,632 | Great Britain | Feb. 17, 1936 |
| 771,836 | France | Aug. 6, 1934 |

Certificate of Correction

Patent No. 2,469,683                                             May 10, 1949

JAMES R. DUDLEY ET AL.

It is hereby certified that errors appear in the printed specification of the above numbered patent requiring correction as follows:

Column 2, line 14, for the word "kilograms" read *kilograins*; column 4, line 30, for "foot or" read *foot of*;

and that the said Letters Patent should be read with these corrections therein that the same may conform to the record of the case in the Patent Office.

Signed and sealed this 27th day of December, A. D. 1949.

[SEAL]

THOMAS F. MURPHY,
*Assistant Commissioner of Patents.*